Dec. 19, 1967  C. R. FEGLEY  3,358,852
APPARATUS FOR ORIENTING, CLAMPING, AND ROTATING ARTICLES
Filed Feb. 28, 1966  3 Sheets-Sheet 1

INVENTOR
C.R. FEGLEY
By R. P. Miller
ATTORNEY

Dec. 19, 1967   C. R. FEGLEY   3,358,852
APPARATUS FOR ORIENTING, CLAMPING, AND ROTATING ARTICLES
Filed Feb. 28, 1966   3 Sheets-Sheet 2

Dec. 19, 1967  C. R. FEGLEY  3,358,852
APPARATUS FOR ORIENTING, CLAMPING, AND ROTATING ARTICLES
Filed Feb. 28, 1966  3 Sheets-Sheet 3

United States Patent Office 3,358,852
Patented Dec. 19, 1967

3,358,852
APPARATUS FOR ORIENTING, CLAMPING, AND ROTATING ARTICLES
Charles R. Fegley, Laureldale, Pa., assignor to Western Electric Company, Incorporated, New York, N.Y., a corporation of New York
Filed Feb. 28, 1966, Filed 530,729
6 Claims. (Cl. 214—1)

This invention relates to an apparatus for orienting, clamping, and rotating articles, and more particularly to an apparatus including a pair of opposed jaws which execute an arcuate advance to orient and clamp a transistor component in position whereafter the jaws and the component may be rotated relative to a fabricating tool.

In the automatic manufacture of many types of articles such as transistors, it is necessary to initially orient and then positively hold the article while it is beng advanced relative to one or more fabricating or testing devices. Considerable difficulty is encountered in the manufacture of transistors because only selected parts may be engaged for orienting and positive holding. Further, it is necessary to not only provide facilities for orienting and holding transistors, but these facilities must also function to accurately move the transistor relative to the fabricating device without damage.

In one transistor assembly operation, small wire leads are bonded to an array of studs projecting from a transistor header. In order to automatically bond these wire leads, it is necessary to provide a positive acting facility for receiving a succession of transistor headers, orienting and clamping each header, rotating the header relative to bonding tool, and then release and remove the header from the facility.

An object of this invention resides in a new and improved apparatus for orienting, clamping and rotating articles.

An object of the invention resides in facilities for imparting arcuate translatory motion to a pair of jaws which function to orient and clamp a component, such as a transistor header in a rotatable head.

A further object of the invention is the provision of a rotatable head cooperating with a locking means which initially holds the head in position to receive a component and which is moved to release the head and control the actuation of facilities for orienting and clamping the component in the head.

Another object of the invention resides in an eccentric crank mechanism driving two sections of a member in an arcuate translatory path so that any possibility of hang up on a dead center position is avoided.

With these and other objects in view, the present invention contemplates a pair of jaws mounted in a head together with facilities that function to move the jaws in an arcuate path within a single plane to orient and then clamp a transistor component in an oriented position, whereafter, facilities are rendered effective to rotate the jaws to move sections of the component relative to a fabricating device, such as a wire lead bonding tool. The movement of the jaws is achieved by a rack-gear device that drives an array of cranks to simultaneously impart motion to both jaws whereupon sections of the jaws engage and orient the component while other sections of the jaws force and clamp portions of the component against a trackway extending through the head. This head also serves as a mounting for the rack-gear device, the array of cranks, and the jaws. The head is mounted for rotation so that the now clamped component may be moved relative to the wire lead bonding tool.

Other objects and advantages of the present invention will be apparent from the following detailed description when taken in conjunction with the accompanying drawings, wherein.

Figure 4:
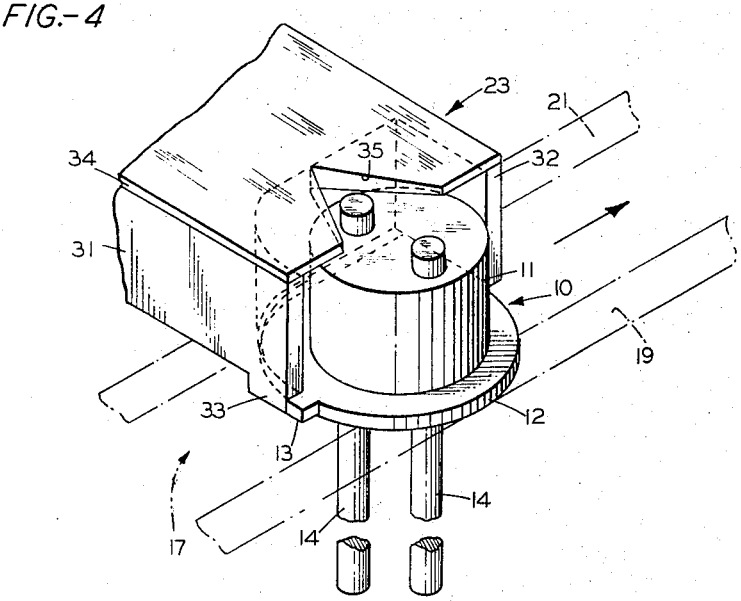
Figure 5:
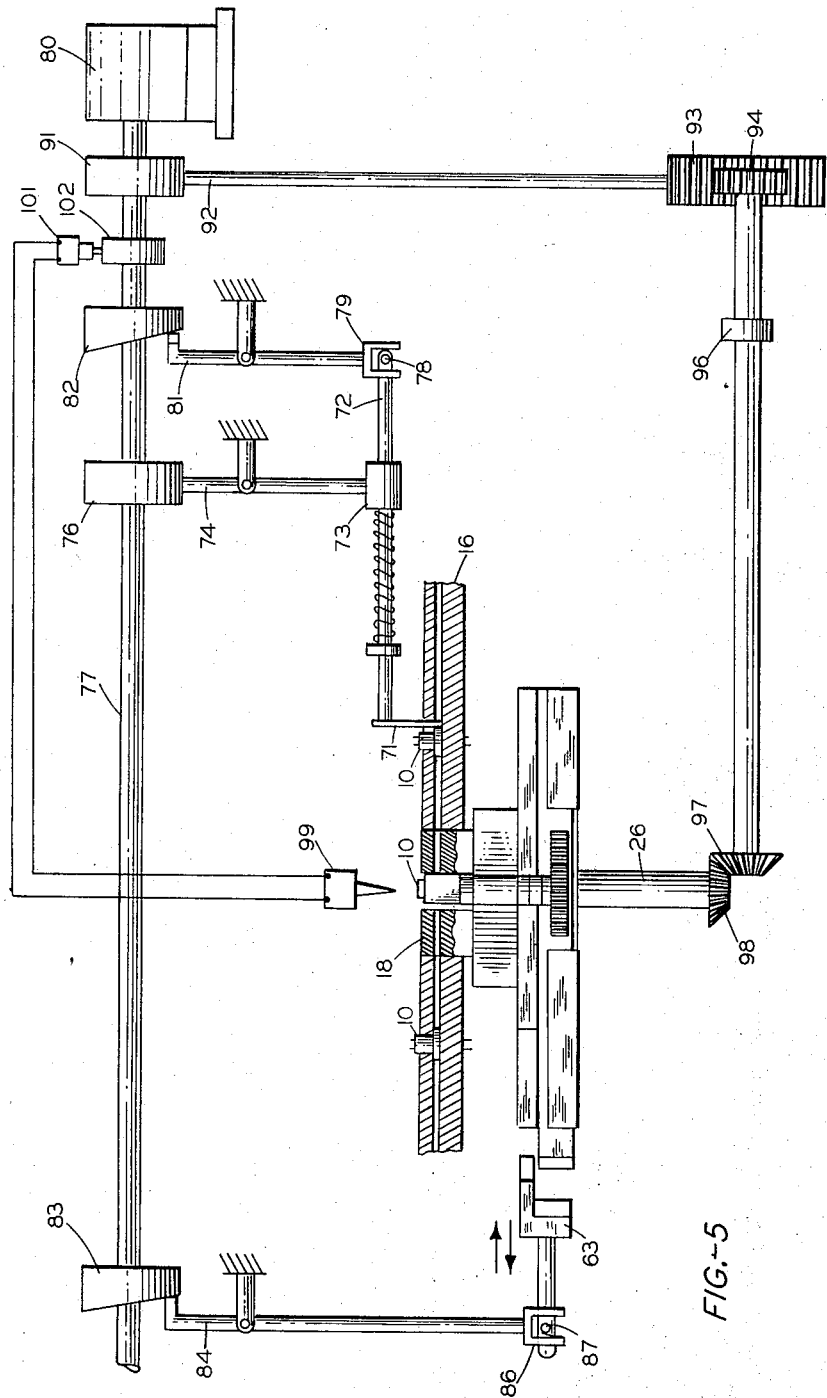

FIG. 4 is an enlarged perspective view of one of the jaws depicting an orienting projection and a spring blade clamp for respectively orienting and clamping the transistor header in the rotary head; and FIG. 5 is a schematic diagram of an array of mechanisms for automatically and sequentially operating the overall apparatus to weld a plurality of wire leads onto a group of studs projecting from the transistor header.

Referring first to FIG. 4, there is shown a transistor header 10 which may be oriented, clamped and rotated by the apparatus forming the subject matter of the present invention. This transistor header comprises a metallic cap-like case 11 having a flange 12 and a projecting tab 13. A pair of stud leads 14 are sealed in the case 11 by a glass bead.

Transistor headers 10 are incrementally advanced along a trackway 16 (see FIG. 1) into a guideway 17 formed in a cylindrical head 18. The guideway 17 includes a pair of oppositely disposed slots 19 and 21 for supporting the flange 12 of the header 10. It is to be understood, however, that the slots 19 and 21 may be replaced by a pair of gibs. The head 18 has formed therein an intersecting slot 22 running transverse to the guideway 17. The slot 22 is sufficiently wide to receive and permit arcuate movement of a pair of jaw units generally designated by the reference numerals 23 and 24. It is these jaw units that are used to orient and clamp the header 10 during rotation of the head 18 relative to one or more fabricating devices, such as a lead bonder which functions to attach wire leads to the stud leads 14.

Figure 1:
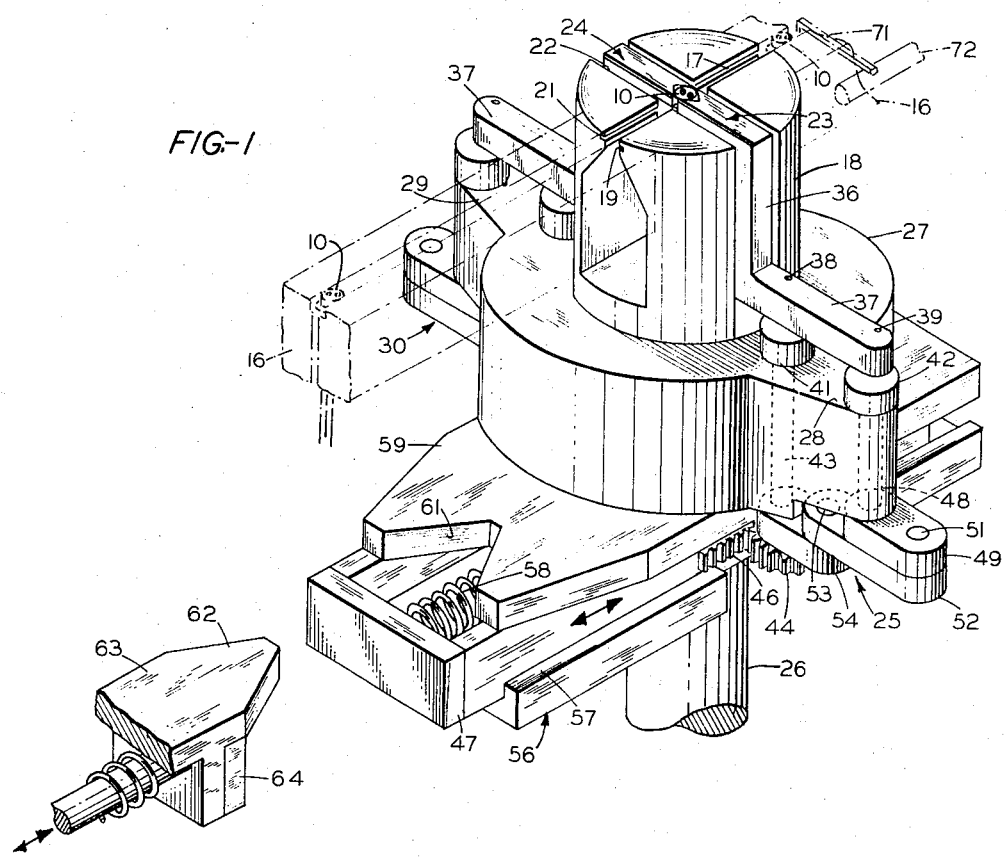
FIG. 1 is a perspective view of an apparatus for orienting, clamping and rotating a transistor header in a rotary head, embodying the principles of the present invention.

The head 18 is secured to a shaft 26 mounted for rotation. The head 18 is also secured to or has integrally formed therewith, a hub having a pair of oppositely extending bosses 28 and 29 each of which supports mechanisms 25 and 30 for operating the jaw units 23 and 24. Referring to FIGS. 1 and 4 for a consideration of jaw unit 23, which is substantially identical to jaw unit 24, it consists of an upper section made up of a pair of side channels 31 and 32, a depending orienting projection 33 and a leaf or blade spring 34. The depending projection 33 is adapted to be moved to engage the tab 13 of the header 10 and orient this tab along the center line of the guideway 17. The leaf spring 34 is fastened at its trailing extremity to a bar-like member 36 which is also secured to side channels 31 and 32. The leading end of the leaf spring 34 is provided with a V-shaped slot 35 for accommodating one of the stud leads 14. The underside of the forward end of the leaf spring 34 is tapered so that upon sliding engagement with the case 11, the transistor header 10 is urged to move down to clamp the flange 12 against the bottom surfaces of the guide slots 19 and 21. The jaw units 23 and 24 each further include a radially extending arm 37 attached to or formed integral with member 36.

The actuating mechanism 25 (see FIGS. 1 and 2) for operating the jaw unit 23 will be described in detail, and it is to be understood that the mechanism 30 provided for operating the jaw unit 24 is substantially identical. The arm 37 has a pair of drive pins 38 and 39 extending therefrom into suitable apertures formed eccentrically in a pair of hubs 41 and 42. The hub 41 rests on the boss 28 and is pinned to a shaft 43 attached at its lower end to a pinion 44 meshing with a rack 46 attached to a slide frame 47. The hub 42 is attached to a shaft 48 that extends through a bore in the boss 28 and is secured to one end of a crank 49, the other end of which receives a pivot pin 51 extending from a link 52. The link 52 is rotatably mounted on its opposite end to a pivot stud shaft 53 extending from a crank 54 which is attached at its other end to the shaft 43.

Figure 2:
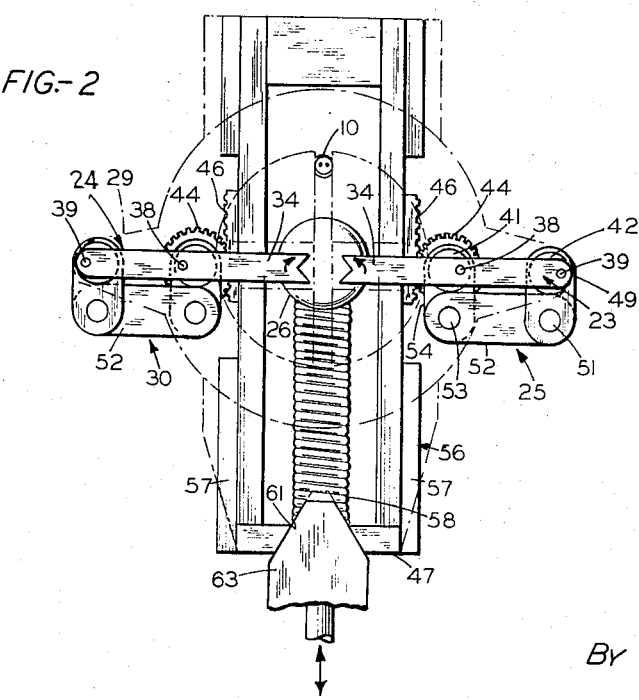
FIG. 2 is a top plan view of the apparatus shown in FIG. 1, particularly illustrating the relative position of a slide lock for holding the head from rotating while also holding a pair of orienting and clamping jaws in an open position.

Initially, the jaw members 23 and 24 are held in an open position, as shown in FIG. 2, and upon actuation of the jaw closing mechanisms 25 and 30, the jaw units 23 and 24 will describe arcuate translatory paths to move toward and engage a header 10. The jaw unit 23 moves in a counterclockwise direction while the jaw unit 24 moves in a clockwise direction so that one of the orienting projections will engage a tab 13 that is not positioned along the center line of the guideway 17. One or the other projections usually engage a tab 13 to rotate the header 10 into the oriented position while the respective leaf springs 34 of both jaw units 23 and 24 engage the top of the cap-like case 11 to urge the header 10 downwardly to clamp flange 12 against the bottom surfaces of the guideway slots 19 and 21. In order for the orientation to take place, it is only necessary to feed the headers 10 into the head 18 with the tabs facing in the general direction of the guideway 17. The jaw units will take care of the finite orientation necessary for subsequent rotation of the header relative to a fabricating or testing device.

Returning now to a consideration of the facilities for moving the slide frame 47 to actuate the jaw units 23 and 24, there is shown in FIG. 1 a guide bed 56 having gibs 57 to provide sliding support for the frame 47. A compression spring 58 normally urges the frame 47 toward the left, as viewed in FIG. 1, to hold the jaw units 23 and 24 in the clamping position. The shaft 26 mounting the head 18 is held from rotation by an elongated plate 59 secured to the shaft and having a V-shaped notch 61 to receive the beveled tip 62 of a lock slide 63. The lock slide 63 has a depending projection 64 engaging the front end of the frame 47 to compress the spring 58 to control the operating mechanisms 25 and 30 to hold the jaw units 23 and 24 in open positions, as shown in FIG. 2. Normally, the lock slide is positioned in a right-hand position, as illustrated in FIG. 2, to lock the head 18 from rotation while the depending projection 64 holds the operating mechanisms 25 and 30 so that the jaw units 23 and 24 are spaced from each other to receive a header 10 therebetween.

Figure 3:
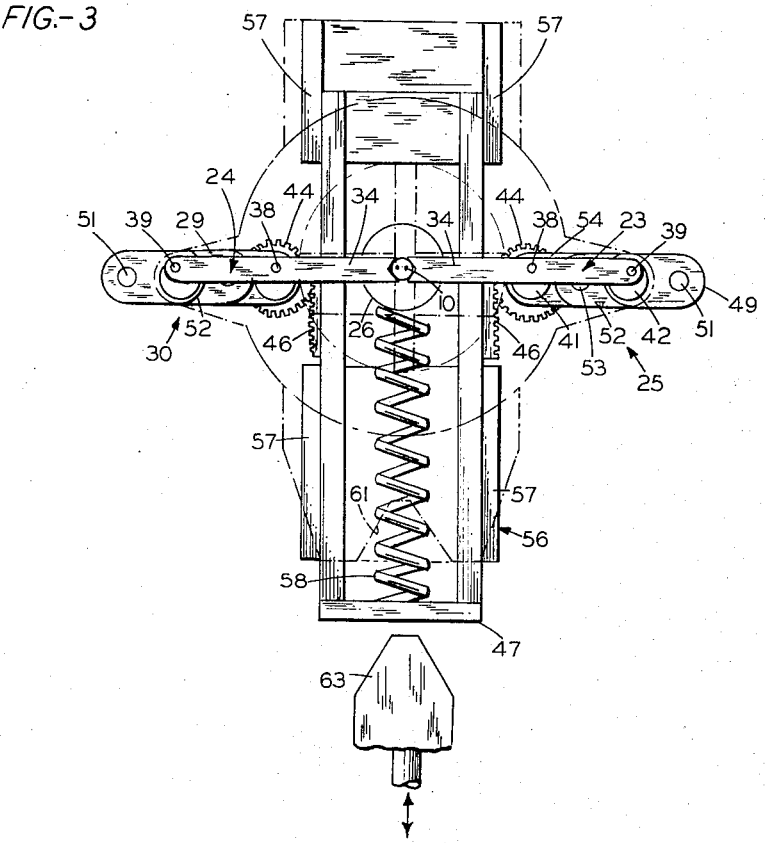
FIG. 3 illustrates the relative position of the slide lock after release of the head showing the actuation of a crank-link mechanism in closing the jaws.

Considering now the operation of the jaw units 23 and 24, the lock slide 63 is moved toward the left, as viewed in FIGS. 1, 2 and 3, so that the spring 58 expands to move the slide frame 47 toward the left. Considering in particular the operation of the jaw unit 23, which is substantially identical to operation of the jaw unit 24, movement of the frame 47 advances the rack 46 to rotate the pinion 44. The pinion 44 rotates the shaft 43, the collar 41 and the eccentrically mounted pin 38 to impart an arcuate turning moment to the arm 37 which, in turn, is imparted through member 36 to the jaw unit 23. Rotation of the shaft 43 is also imparted to the crank 54 which moves in a counterclockwise direction and moves the pivot stud 53 in a like direction. Movement of the pivot stud 53 is imparted through the link 52 to the pin 51 which imparts a counterclockwise movement to the crank 49. This movement of the crank 49 is impressed through the shaft 48 to the hub 42 so that the eccentrically mounted pin 39 imparts a counterclockwise turning moment or force to the member 37 which is identical to the turning moment imparted to this member by the eccentrically mounted pin 38. Inasmuch as both pins 38 and 39 have turning moments applied thereto, there is no possibility of the arm 37 being held up on a dead center position. Thus, jaw unit 23 moves in an arcuate translatory path to advance the beveled forward edge of the leaf spring 34 over the top of the case 11 of the header 10. The depending projection 33 of the jaw unit 23 also swings in an arcuate path to engage the tab 13, if misaligned in the guideway 17 toward the projection 33 of the jaw unit 23. As the jaw unit 23 moves in an arcuate path toward the header 10, the blade spring 34 engages and urges the header 10 in a downward direction to clamp the flange against the bottom of slot 19. However, if the tab 13 is misaligned in the guideway 17 toward the projection 33 of the jaw unit 24, then this jaw unit will engage and pivot the header to align the tab 13 along the center line of the guideway 17. It is to be understood that operating mechanism 30 functions in the same manner as operating mechanism 25, but the jaw unit 24 has an arcuate translatory movement which is in a clockwise direction.

Considering now the overall operation and with particular reference to FIGS. 1 and 5, a succession of headers 10 are advanced into the orienting and clamping head 18. The headers are incrementally advanced by feed fingers 71 attached to a slide bar 72 which is supported by a bearing sleeve 73 having a cam follower rod 74 riding on the periphery of a cam 76 secured to a constantly rotating cam shaft 77 driven by a motor 80. The trailing end of the slide bar 72 is provided with a pin 78 riding within a yoke 79 attached to a pivotally mounted cam follower 81 that rides on a face cam 82 also secured to the cam shaft 77. The cam 76 functions to advance and retract the rod 74, the bar 72 and the feed fingers 71 toward and away from the headers 10. While the feed fingers 71 are advanced, the cam 82 functions to advance the slide bar 72 and the feed fingers 71 to advance a single header along trackway 16 into the guideway 17 of the head 18.

Following advance of a header 10 into the guideway 17, a face cam 83 attached to the shaft 77 is rendered effective to pivot a follower arm 84, which arm has a yoke 86 subtending a pin 87 secured to the lock slide 63. The lock slide 63 moves toward the left, from the position shown in FIG. 2, to the position shown in FIGS. 1, 3 and 5. The compression spring 58 is rendered effective and expands to move the frame slide 47 and the rack 46 to rotate the pinion 44 so that rotary motion is imparted to the shaft 43 to rotate the hub 41 and the eccentrically mounted pin 38. Simultaneously therewith, the motion of the shaft 43 is transferred through the crank 54, the pin 53, the crank 52, the pin 51 and the crank 49 to the shaft 48. The shaft 48 rotates in the same direction as the shaft 43 so that the hub 42 rotates the eccentrically mounted pin 39 to impart motion to the arm 37. Both the eccentrically mounted pin 38 and the eccentrically mounted pin 39 cooperate to move the arm 37 in an arcuate planar path. This arcuate planar movement is imparted through the bar 36 to the jaw unit 23.

In a like manner, movement of the frame slide 47 is utilized to impart an arcuate planar movement to the jaw unit 24 which is in a direction opposite to the jaw unit 23. If the tab 13 of the header 10 is canted to either side of the center line of the guideway 17, then a projection 33 on either the jaw unit 23 or 24 engages the tab to rotate the header 10 and thereby orient the header 10 along the center line of the guideway. As the jaw units 23 and 24 move towards the header 10, the spring blades 34 ride on the top of the cap 11 to force the header 10 in a downward direction to clamp the flange 12 against the bottom surfaces of the guide slots 19 and 21.

When the lock slide 63 is withdrawn, the beveled tip 62 moves from within the V-shaped notch 61 to release the elongated projection plate 59 thereby releasing the shaft 26 and the head 18 for rotation. Next, a lobe on a cam 91 moves a follower 92 to advance a rack 93 to drive a gear 94. Rotation of the gear 94 is imparted through a oneway clutch 96 to a bevel gear 97 that functions to rotate a bevel gear 98 attached to the shaft 26. Rotation of the head 18 moves the header 10 to position one of the stud leads 14 into alignment with a wire lead bonder 99. The wire lead bonder 99 is energized by a simple circuit connected to a switch 101 that is now actuated by a lobe on a cam 102 attached to the cam shaft 77. Following the bonding of a wire lead to the stud 14, the cam 91 presents another lobe to the follower 92 to again rotate the shaft 26 whereupon the second stud lead 14 is moved into position to have a wire lead bonded thereto by the wire lead bonder 99. After completion of the welding operation and rotation of the header 10 to the initial position, the face cam 83 advances to present a lobe portion to the follower 84 to again move the lock slide 63 toward the head 18. The beveled tip 62 moves within the notch 61 to lock the shaft 26 from further movement. This movement of the lock slide 63 advances the depending projection 64 to move the frame slide 47 against the spring 58 whereupon the rack 46 restores the operating mechanisms 25 and 30 associated with the jaw units 23 and 24 to the initial open positions in anticipation of another cycle of operation. Additional feed fingers, similar to feed fingers 71, may be added to an extension of the slide bar 72 to withdraw the header 10 from the guideway 17.

It is to be understood that the above-described arrangements of apparatus and construction of elemental parts are simply illustrative of an appplication of the principles of the invention and many other modifications may be made without departing from the invention.

What is claimed is:

1. In an article gripping and rotating apparatus,
a head mounted for rotary movement,
a pair of gripping units mounted in said head for arcuate translatory movement toward each other to grip an article positioned therebetween,
means for holding said head from rotation,
means for releasing said holding means,
means operated by the release of said holding means for imparting said arcuate translatory movement to said gripping units, and
means rendered effective upon completion of said arcuate translatory movement of said gripping units for rotating said head.

2. In an apparatus for orienting, clamping, and delivering an article having a tab to a work station,
a head mounted for rotation relative to said work station,
a pair of opposed jaw units mounted on said head for arcuate translatory motion with respect to said head, each of said jaw units having an orienting projection for engagement with said tab,
said head having means for supporting said article between said jaw units,
means rendered effective by closing of said jaw units for urging said article against said supporting means,
means for closing said jaw units with said arcuate translatory motion whereupon said orienting projections engage said tab and said urging means are rendered effective, to orient and lock said article, and
means for rotating said head relative to said work station.

3. In an apparatus as defined in claim 2 wherein:
said article supporting means comprises a guideway slot extending through said head, and
said head having a slot transversely intersecting said guideway through which said jaw units move with said arcuate translatory motion to orient and lock said article in said guideway slot.

4. In a device for orienting and gripping articles having a peripheral flange and a tab projecting from said flange,
a head having a horizontal slot extending therethrough said head also having opposed guideways extending from said slot,
means for feeding an article into said slot with the flange sliding along bearing surfaces of said opposed guideways,
said head having an opening running transverse to said slot and extending to the bearing surfaces of said guideways,
a pair of opposed slide jaws units mounted in said opening for arcuate translatory movement toward and away from each other,
means for imparting arcuate translatory motion to said slide jaw units to advance toward the article positioned in said guideway.
a pair of projections individually extending from said jaw units for engaging said tab to rotate said article to position the tab to extend along a center line of said horizontal slot, and
a pair of plate springs mounted on said jaw units, each of said plate springs having a beveled forward end for engaging and resiliently urging said article against said bearing surface.

5. An article orienting and gripping apparatus which comprises,
a head having a transverse slot for receiving a succession of individual articles,
means for mounting said head for rotation,
a pair of jaws mounted for movement on said head to orient and grip an article advanced in said slot,
spring means for opening and closing said jaws,
a stop member projecting from said head for holding said head from rotation,
a stop actuator slide mounted for movement into holding engagement with said stop member and for compressing said spring means to open said jaws,
means for moving said stop actuator slide from holding engagement with said stop member and releasing said spring means to close said jaws, and
means rendered effective upon withdrawal of said actuator slide for rotating said head.

6. In an article gripping device,
a first shaft having an eccentrically mounted first pin extending from one end thereof,
a second shaft mounted parallel to said first shaft and having an eccentrically mounted second pin extending from one end thereof,
a jaw member rotatably mounted on both of said pins,
a first crank secured at a first end to said first shaft,
a second crank pivotally mounted at a first end to a second end of said first crank,
a third crank pivotally mounted at a first end to a second end of said second crank and secured at a second end to said second shaft, and
means for rotating said first shaft to impart an arcuate translatory movement to said jaw member.

References Cited
UNITED STATES PATENTS
2,192,388   3/1940   Schulz.
2,723,743   11/1955   Carter _____ 198—33

GERALD M. FORLENZA, Primary Examiner.

F. E. WERNER, Assistant Examiner.